United States Patent Office 3,364,422
Patented Jan. 16, 1968

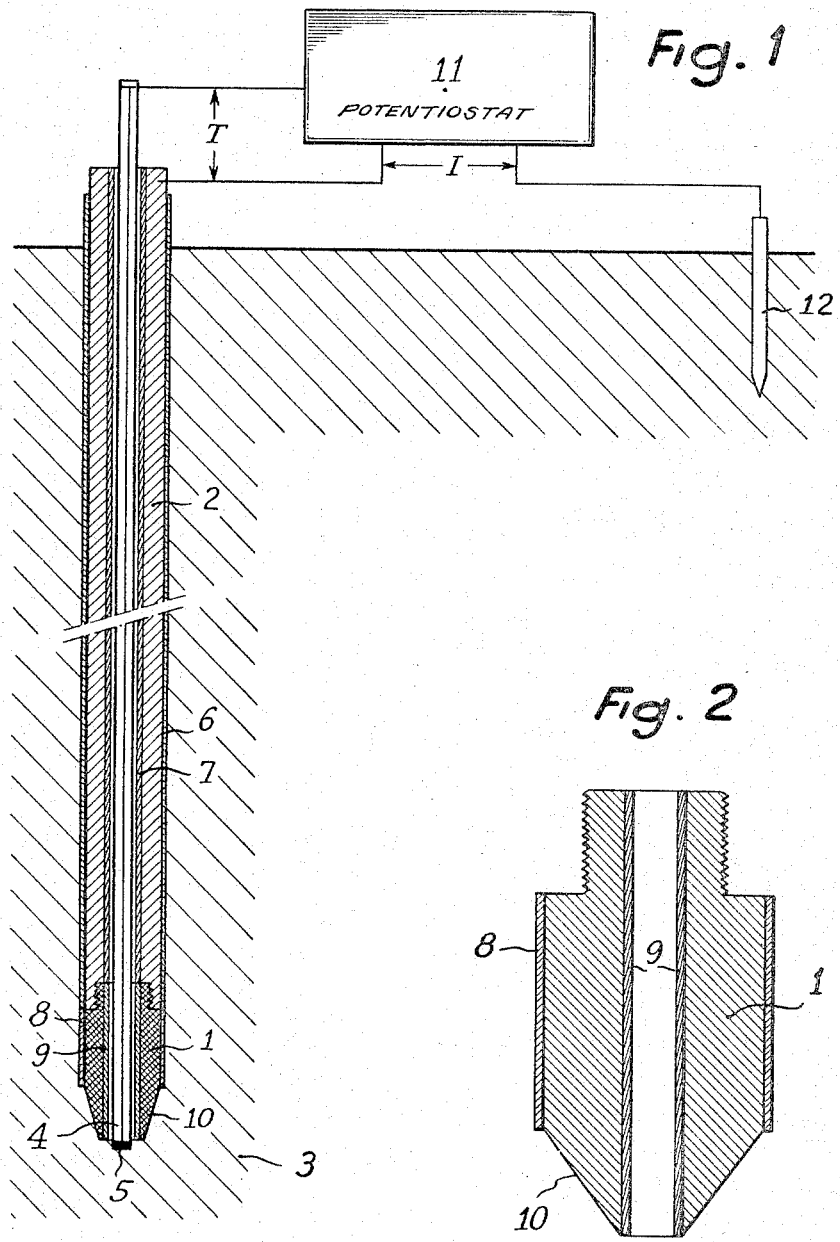

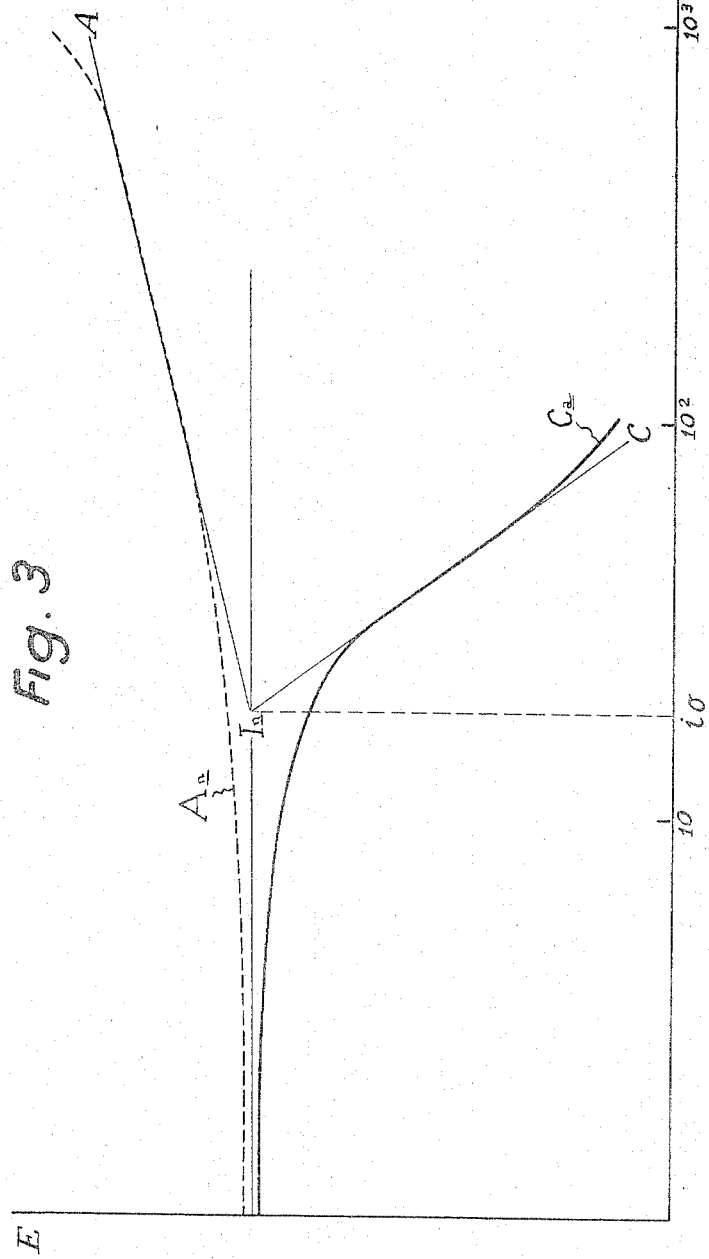

3,364,422
DEVICE FOR DETERMINING THE POWER OF METAL CORROSION HAVING A PROBING ROD ADAPTED AT ITS PROBING END TO FIX A TEST MATERIAL
Bernard Marie Louis Heuze, Boulogne, Hauts-de-Seine, France, assignor to Societe d'Etudes Contre la Corrosion (Secco), Paris, France, a French body corporate
Filed Oct. 16, 1963, Ser. No. 316,655
Claims priority, application France, Oct. 17, 1962, 912,594
5 Claims. (Cl. 324—71)

It is known often to be necessary to choose a metal material in relation to its resistance to corrosion with respect to a certain environment. For example, in the case of underground pipes the choice is between cast iron, steel, or reinforced concrete. An essential element of appreciation is the sensitivity of these different materials to the power of attack of the water and the ground in which they are placed.

They must therefore be classified according to their resistance to corrosion in the environment by measuring the latter, at least relatively.

It may also be necessary to study the power of attack of several environments with respect to a determined material.

For this purpose a potentio-kinetic study of the material is effected when it is in the presence of the active environment. On a sample of the material, the surface of which is known, is applied a voltage which is varied as a function of time according to a determined law, generally linear, where the speed of variation of the potential is such that the opposing electro-motive force due to the polarisation of the sample always balances the electromotive force applied to the sample.

In the case of steel, for example, the potential applied to the sample is varied linearly by about 1 volt per hour following decreasing algebraic values for the study of cathodic behaviour, and following increasing algebraic values for the study of anodic behaviour.

At the same time the strength and the direction of the electric current exchanged between the sample and the environment is measured and registered, the results being then expressed in terms of current density (micro amperes per square centimetre of surface of the sample).

A diagram with a semi-logarithmic scale in which the values of the voltage applied to the sample are marked on the cartesian axis and the values of the density of the current exchanged between the sample and the environment are marked upon the logarithmic axis result in two curves, one anodic and the other cathodic, which are asymptotes to two straight lines. It is known that the point of intersection of these two lines corresponds to the density of the current for which the reactive anodic and cathodic current are equal. This current density is in direct proportion to the extent of the corrosion of the material in the environment.

Up to now this potentio-kinetic study which gives excellent results has only been carried out in a laboratory. But it is extremely difficult to take to the laboratory a sample of the environment which has not undergone any modification during its removal and transport.

If, as is the most frequent case, it is desired to apply this method to determine the resistance to corrosion of a material in a piece of ground, it is essential that the density, the pH value, the water, oxygen and bacteria content of the sample of ground should not have been appreciably changed during removal and transport. Numerous precautions must be taken and a specialised team cannot, in certain cases, take more than two or three samplings on each day. This is the reason why this method has not become as wide-spread as the excellent results it gives would have allowed.

Moreover, the removal and transport of the samples which in spite of the precautions taken may have undergone extensive modifications constitute a source of error which can falsify the conclusions.

It is an object of the present invention to provide a process and a device which allows the potentio-kinetic study of a material to be carried out at the site where the structure which it will constitute will be located, hence exactly in those conditions in which it will be subjected to corrosion.

The process and the device are very simple, easy to use, allowing a large number of measurements to be made in a limited time and with greater certainty without the necessity of removing and transporting the samples from the environment.

The present invention is especially characterised in the fact that the sample of the material to be studied is located in the end of a hollow probing rod in the interior of which is inserted a reference electrode.

Other characteristics of the invention will become clear from the following embodiments illustrated with reference to the accompanying drawings, in which:

FIGURE 1 shows an axial section through a device according to the invention located in the ground, FIGURE 2 shows a section through a sample of the material to be studied, FIGURE 3 shows a diagram drawn as a result of the measurements carried out which indicate the corrosion of the material in the environment, and FIGURES 4 and 5 show sections through samples of different shapes of the material to be treated.

Referring now to the drawings, the sample 1 of the material to be studied in which a central bore has been provided, is placed at the end of a hollow probing rod 2 in such a way that the bores of the sample and of the probing rod are in alignment. The rod and sample are placed in contact with the ground 3, the corrosive power of attack of which upon the material is to be determined. A reference electrode 4 of a known type and with which per se the invention is not concerned, is introduced into the bores of the probing rod and of the sample in such a way that the sensitive part 5 of the electrode is also in contact with the ground.

The probing rod 2 comprises a steel tube, the internal and external faces of which are covered by electrically insulating sleeves 6 and 7 but it can also be made from an electrically conductive material of any desired kind.

A sample 1 of a material to be studied, and shown in section in FIGURE 2, is machined in such a way as to allow it to be screwed on to the probing rod, at the end of which a corresponding thread has been provided for this purpose, but it can be attached by any other appropriate fashion. Its interior bore has the same diameter as that of the probing rod and the cylindrical part has the same exterior diameter as that of the probing rod.

The interior bore and the cylindrical part are covered by electrically insulating sleeves 8 and 9 which extend in line with the sleeves 6 and 7. Only the truncated tapered or conical section 10 is in contact with the ground, its surface being exactly known by measurement. This is the "usable" surface of the sample.

Insulating sleeves 6, 7, 8 and 9 can, of course, be put in position at the time when the sample is located at the end of the probing rod, in which case sleeves 6 and 8, and the sleeves 7 and 9, may each be constituted by a single sleeve.

The part of the sample in contact with the ground can have a different shape, for example it may be part-spherical or flat.

The reference electrode 4 is of a known type and its sensitive part 5 is in contact with the ground in the immediate vicinity of the sample to be studied. It is known that this is a condition for accurate measurement. In order to locate the probing rod, the sample to be studied and the reference electrode, the following procedure can be followed: a drill is used to bore into the ground to the depth required, and the probing rod provided with the sample to be studied is introduced and thrust down in such a way that the "usable" surface of the sample is in contact with the ground at all parts of its surface. This operation is facilitated by the tapered or conical form shown for the sample, and by the ground to be studied which is usually sandy, clayey or boggy, and generally only offers a weak resistance to penetration by the rod. When the sensitive part is in place, the earth which has penetrated into the interior bore is removed, using a metal rod. The reference electrode is then introduced into this bore.

A recording potentiostat 11 is connected to an earthing terminal 12 that comprises one or more pegs pushed into the ground at some distance from the probing rod, and also to the reference electrode 4 and to the probing rod 2 which has a continuous electric connection with the sample to be studied. When the voltage is applied to the sample by the current delivered between the probing rod and the earth connection 12 by the circuit T, the potentiostat records the potential of the interfacial ambient environment of the sample to be studied, and on the circuit I measures the magnitude and sign of the electric current exchanged between the sample and the environment.

As in the laboratory the reading of the results registered are then proceeded with.

FIGURE 3 represents a diagram drawn as a result of these measurements. On the cartesian axis is marked the values of the variable voltage E to which the sample has been carried.

On the axis with a semi-logarithmic scale is noted the current density (micro amperes per square centimetre of usable surface of the samples) of the current exchanged between the environment and the sample.

The anodic curve is shown at $An$ and the cathodic curve at $Ca$. These curves are tangential to the two lines A and C which intersect at $In$, the point corresponding to the density of the currents $io$. The intensity of the corrosion of the sample in the environment is in direct proportion to $io$.

When fixing the value of $io$ for several samples in a determined environment, or the value of $io$ for a sample in several determined environments, the samples are classified according to their sensitivity to the corrosion in an environment, or the environments according to their corrosive power in relation to a material.

It can be seen that this method of potentio-kinetic measurement in situ made possible by the above-described device, enables the corrosion of a material in a determined environment to be measured very easily, while respecting the integrity of the environment, much better than carrying out these measurements in a laboratory and thus eliminates an important source of errors.

It will also be noted that in the device described above the reference electrode is located in immediate proximity to the sample and that thus the potential measured is actually that of the metal interface—the ambient environment which is one of the conditions of the accuracy of the results.

The invention is, of course, not limited to the foregoing embodiment on the basis of which different embodiments and applications can be conceived.

I claim:
1. A device for determining in combination with a potentiostat by the potentiokinetic method applied in situ, the power of corrosive attack of an ambient environment on a metal material, said device comprising a probing rod having a longitudinal bore and comprising means at its probing end for removably holding in electrical contact with said environment a sample of the material to be studied which has a bore coaxial with that of the said probing rod, a first electrically conducting path insulated from said environment between said sample and said potentiostat, a reference electrode dimensioned to be inserted in said bores through the end of said probing rod remote from said probing end until its sensing part is positioned at said probing end in contact with said environment in the immediate vicinity of but insulated from said sample, and a second insulated electrically conducting path between said reference electrode and said potentiostat, said bores being lined with an electrical insulator and the external surface of the probing rod and of the sample, with the exception of an exactly measured section of the sample, being likewise covered with an electrical insulator.

2. A device according to claim 1, in which the external surface of the sample which is not provided with an electrical insulator is a conical surface.

3. A device according to claim 1, in which the external surface of the sample which is not provided with an electrical insulator is a spherical surface.

4. A device according to claim 1, in which the external surface of the sample which is not provided with an electrical insulator is a flat surface.

5. A device according to claim 1, in which the reference electrode is located at the end of the bore of the sample to be studied.

References Cited

UNITED STATES PATENTS

| | | |
|---|---|---|
| 1,910,021 | 5/1933 | Legg. |
| 2,172,778 | 9/1939 | Taylor _____ 324—9 X |
| 2,750,562 | 6/1956 | Starr _____ 24—72.5 X |
| 2,947,679 | 8/1960 | Schaschl et al. _____ 324—71 |
| 2,993,366 | 7/1961 | Birkness _____ 73—86 |
| 3,008,085 | 11/1961 | Dravnieks _____ 324—71 |
| 3,085,426 | 4/1963 | Freedman et al. _____ 338—13 X |
| 3,102,979 | 9/1963 | Schaschl _____ 204—1.1 X |
| 3,229,200 | 1/1966 | Rayburn _____ 324—65 X |
| 3,236,096 | 2/1966 | Macatician et al. ____ 324—71 X |

RUDOLPH V. ROLINEC, *Primary Examiner.*

E. E. KUBASIEWICZ, *Assistant Examiner.*